United States Patent [19]

Gleckler et al.

[11] 4,252,831

[45] Feb. 24, 1981

[54] MOLASSES-COATED FEED-GRADE CALCIUM PHOSPHATES AND PROCESS

[75] Inventors: Ronald R. Gleckler; Stefan Zahursky, both of Palmyra, Mo.

[73] Assignee: American Cyanamid Company, Stamford, Conn.

[21] Appl. No.: 37,088

[22] Filed: May 8, 1979

Related U.S. Application Data

[63] Continuation-in-part of Ser. No. 814,602, Jul. 11, 1977, abandoned.

[51] Int. Cl.³ .............................................. A23K 1/175
[52] U.S. Cl. ..................................... 426/74; 426/103; 426/302; 426/658; 426/807; 427/220; 428/403; 71/33
[58] Field of Search ................... 426/97, 807, 74, 103, 426/302, 635, 658; 71/23, 26, 11, 64 DB, 64 D, 64 DA, 64 F, 33; 427/220, 215; 428/403

[56] References Cited

U.S. PATENT DOCUMENTS

| 3,468,667 | 9/1969 | Chandler | 426/97 |
| 4,062,988 | 12/1977 | DeSantis | 426/807 X |

FOREIGN PATENT DOCUMENTS 6609  8/1914  United Kingdom ................... 426/807

*Primary Examiner*—William F. Smith
*Assistant Examiner*—Ferris H. Lander
*Attorney, Agent, or Firm*—H. G. Jackson

[57] ABSTRACT

The invention is solid compositions comprising feed-grain calcium phosphates surface-coated with a mixture of molasses and a surfactant, wherein the compositions are characterized by having substantially reduced dusting properties as compared to similar but uncoated products. The invention further relates to a process for coating feed-graide calcium phosphates with a mixture of molasses and a surfactant to minimize dusting of the products.

8 Claims, No Drawings

MOLASSES-COATED FEED-GRADE CALCIUM PHOSPHATES AND PROCESS

This application is a continuation-in-part of copending U.S. Ser. No. 814,602 filed July 11, 1977, and now abandoned.

Monocalcium phosphate, dicalcium phosphate, and mixtures thereof, are important animal feed additives and serve as supplementary sources of phosphorus and calcium in the diet of domestic animals, such as cattle, sheep, goats, swine, chickens, geese, ducks, turkeys, and the like. The feed-grade calcium phosphates are usually prepared by reacting finely ground limestone with defluorinated phosphoric acid to obtain a damp particulate product. The product is cured, dried and screened. Particles within the $-14$ to $+100$-mesh range are considered product and bagged. Oversize from the screen are crushed and recycled to the product screens. Fines are recycled to the pugmill for admixture with the phosphoric acid and limestone. Fines are usually 75 microns or less in size and will pass through a Tyler 200-mesh screen. Solid particles in this size range may become airborne in the course of normal handling operations, such as bagging, the loading and unloading of trucks, freight cars, hoppers, and the like, and thus may form objectionable dust clouds. Obviously, it would be desirable to prevent the formation of dust while the materials are being handled, and thus minimize the potential inhalation hazard to persons handling the materials.

Surprisingly, we now find that by the novel method of the present invention, the dusting associated with the above-referred-to, feed-grade calcium phosphates can be substantially lessened by surface-coating the ground calcium phosphates with a combination of molasses and selected surfactants.

The molasses used in this process may be selected from beet, cane, citrus, sorghum and wood molasses, or mixtures thereof. The molasses typically will have a viscosity in the range of from about 10,000 to about 35,000 centipoises at ambient temperatures, although molasses with lower or higher viscosities may be used if so desired.

In the case of the feed-grade calcium phosphates, the surfactants are selected from pharmaceutically accepted food and feed-grade surfactants, such as calcium lignosulfonate, glycerol monoricinoleate, and the like.

The novel molasses/surfactant-coated feed-grade monocalcium phosphate, dicalcium phosphate compositions, and mixtures thereof, of the invention, can be prepared as follows:

The above-identified finely divided products are agitated while being maintained at a temperature in the range of about from 50° C. to 80° C., and preferably 65° C. to 71° C., and are subjected to a surface spray of a molasses/surfactant mixture, wherein the mixture is maintained at a temperature range of from about 35° C. to 60° C., and preferably 43° C. to 54° C., and the molasses and the surfactant are selected from the groups identified above, and wherein the amount of the surface spray is sufficient to provide 1% to 3% by weight, and preferably 2% to 3% by weight, of molasses/surfactant mixture per unit weight of the feed-grade calcium phosphates. The spray is preferably applied to a falling curtain of finely divided calcium phosphate product to achieve essentially uniform coating thereof. The thus-coated products are then deposited on a suitable conveyor and transported to a storage hopper. Throughout this operation, the temperature of the products before, during and after coating remains at a temperature range of from about 50° C. to 80° C., and preferably 65° C. to 71° C., and the coated products arriving at the storage hopper are free-flowing, dry, and are remarkably free of loose, dust-forming particles.

In the above procedure, we prefer to use a combination of molasses and calcium lignosulfonate in a ratio of 7:3 by volume for coating feed-grade calcium phosphates.

Alternatively, the coating process of this invention may also be conducted by employing the apparatus disclosed and claimed in U.S. Pat. No. 3,938,469, issued Feb. 17, 1976 (assigned to American Cyanamid Company), and the process using the apparatus, disclosed and claimed in U.S. Pat. No. 3,666,523, issued May 30, 1973 (assigned to American Cyanamid Company).

Thus, feed-grade calcium phosphates are stored in a hopper at a temperature in the range of from about 50° C. to 80° C., and preferably 65° C. to 71° C., and the hopper is fitted with a control gate adapted to produce a metered flow of the solids from the hopper in the form of a falling curtain. The curtain is sprayed with the mixture of molasses and surfactant, preheated to about 35° C. to 60° C., and preferably 43° C. to 54° C., through nozzles disposed so as to apply spray to the opposite sides of the curtain with sufficient force to penetrate the falling curtain of particles and to produce uniformly coated particles. The molasses/surfactant mixture is deposited on the material in amounts from 1% to 3%, and preferably 2% to 3% by weight. The thus-sprayed curtain of feed-grade calcium phosphates is then deposited on a conveyor and transported to a storage hopper. The coated products arriving at the hopper are free-flowing, dry, and are remarkably free of loose, dust-forming particles.

The present invention is further illustrated by the following non-limiting examples.

EXAMPLE 1

Quantitative Determination of the Percent by Weight of Dust-forming Particles Present in Feed-grade Dicalcium Phosphate Samples of powdered dicalcium phosphate are introduced at the top of a chamber and fall through two 6-mesh screens against a countercurrent air stream flowing with a velocity of 2.5 cm sec$^{-1}$. Airborne particles are carried out at the top of the chamber while the rest of the sample is collected in a pan at the bottom of the chamber, and the weight losses are determined. The data obtained are summarized in Tables I and II below, along with the screen analyses (particle size) of the samples evaluated.

TABLE I

Particle Size Composition and Weight Loss of Samples Exhibiting Pronounced Dust Cloud

| Tyler Mesh Size | Percent by Weight Retained Sample | | | |
|---|---|---|---|---|
| | 1 | 2 | 3 | 4 |
| +14 | 1.0 | 0.5 | 0.6 | 0.0 |
| +60 | 66.5 | 80.0 | 45.0 | 52.5 |
| +100 | 22.2 | 14.6 | 26.0 | 40.5 |
| +200 | 8.6 | 4.6 | 21.3 | 6.6 |
| −200 | 1.7 | 1.0 | 8.0 | 1.3 |
| Loss from air chamber, in percent by weight | 0.27 | 0.24 | 0.8 | 0.33 |

TABLE II

Particle Size Composition and Weight Loss of Samples which do not Exhibit a Dust Cloud

| Tyler Mesh Size | Percent by Weight Retained | | |
|---|---|---|---|
| | Sample | | |
| | 5 | 6 | 7 |
| +14 | 2.4 | 0.5 | 1.2 |
| +60 | 92.1 | 97.5 | 90.7 |
| +100 | 3.9 | 1.5 | 6.8 |
| +200 | 1.1 | 0.2 | 1.3 |
| −200 | 0.3 | 0.2 | 0.5 |
| Loss from air chamber, in percent by weight | 0.1 | 0.0 | 0.11 |

It can be clearly seen from the above tables that samples containing relatively large amounts of fines are prone to form dusts.

EXAMPLE 2

Evaluation of the Efficacy of Various Compositions as Dust-suppressing Agents

Methods

A. The dicalcium phosphate sample to be coated is charged into a rotating drum and is then sprayed with the dedusting agent in the form of a fine mist in an amount corresponding to 1% by weight of sample. This procedure is employed to obtain substantially uniform coverage of the treated particles.

B. The dust-suppressing agent is sprayed on top of the product in the form of a fine mist in an amount corresponding to 1% by weight of sample. The coated samples are then evaluated by the method of Example 1 to determine dusting characteristics and weight losses due to dusting. This procedure, as evidenced by the data obtained and provided below, does not provide substantial uniform coverage of the particles. The data obtained with the various dust-suppressing agents and methods of application used are summarized in Table III, below.

From the data in Table III, it can be seen that the molasses/water/glycerol monoricinoleate composition provides excellent dust control; whereas, the water alone, molasses and water, heavy mineral oil/water and glycerol monoricinoleate, and water and glycerol monoricinoleate compositions did not provide the dust control desired.

EXAMPLE 3

Evaluation of a Molasses:Calcium Lignosulfonate Coating Mixture for Dedusting Feed-grade Dicalcium Phosphate

Procedure

A sample of feed-grade dicalcium phosphate (phosphorus content: 18.5% by weight) is maintaned at 71° C. in a holding bin. The bottom of the holding bin is fitted with a vibratory feeder, through which the sample falls into a screw conveyor and is transported by same into a storage bin. Throughout this operation, the temperature of the sample is maintained between 65° C. to 71° C. A falling curtain of the sample is sprayed at a point between the vibratory feeder and the screw conveyor (i.e. in free fall) with a coating mixture of molasses:calcium lignosulfonate (7:3 ratio by volume; specific gravity at 43° C.: 1.13 g cm$^{-3}$) maintained at a temperature range of 43° C. to 54° C., and applied at 1% by weight level. The thus-coated sample is free-flowing and dry when it arrives at the storage bin.

The dusting property of the sample is determined by the procedure of Example 1.

Results

Percent by weight loss of untreated sample: 0.40
Percent by weight loss of treated sample: 0.23
Percent reduction in weight loss: 42.5

EXAMPLE 4

Evaluation of a Molasses:Calcium Lignosulfonate Coating Mixture for Dedusting Feed-grade Dicalcium Phosphate Example 3 is repeated, except that two samples, one containing 3.5% by weight of −200-mesh particles, and the other 0.4% by weight of −200-mesh particles, are coated at 2% by weight level with a molasses:calcium lignosulfonate mixture (7:3 ratio by volume; specific gravity at 43° C.: 1.13 to 1.17 g cm$^{-3}$). The coated samples are evaluated by the procedure of Example 1.

Results

Sample 1

Percent by weight loss of untreated sample: 3.5
Percent by weight loss of treated sample: 0.3
Percent reduction in weight loss: 91.4

TABLE III

Evaluation of the Effect of Various Dust-suppressing Agents Applied at 1% by Weight of Sample

| Dust-suppressing Agent and Percent by Weight Composition | Run Number | Percent Loss by Weight | | Percent Control | Method |
|---|---|---|---|---|---|
| | | Before Application | After Application | | |
| Molasses, 70; | 1 | 1.10 | 0.15 | 95.0 | A |
| Water, 29; | 2 | 1.15 | 0.18 | 97.0 | A |
| Glycerol monoricinoleate, 1 | 3 | 1.15 | 0.24* | 91.0 | A |
| | 4 | 1.10 | 0.87 | 23.0 | B |
| Water, 99.9; | 1 | 1.10 | 0.32 | 54.0 | A |
| Glycerol monoricinoleate, 0.1 | 2 | 1.10 | 0.32 | 54.0 | A |
| Heavy mineral oil, 49.0; | 1 | 0.67 | 0.30 | 37.0 | A |
| Water, 49.0; | 2 | 0.70 | 0.30 | 40.0 | A |
| Glycerol monoricinoleate, 2.0 | | | | | |
| Molasses, 50.0; | 1 | 0.67 | 0.10 | 57.0 | A |
| Water, 50.0 | 2 | 0.67 | 0.22 | 45.0 | A |
| Water, 100.0 | 1 | 0.67 | 0.58 | 9.0 | A |

*Sample evaluated 24 hours after application.

Sample 2

Percent by weight loss of untreated sample: 0.4
Percent by weight loss of treated sample: 0.1
Percent reduction in weight loss: 75.0

Microscopic examination indicates the presence of fines (−200-mesh) embedded in the coating mixture.

It can be clearly seen from the above results that a coating mixture of molasses:calcium lignosulfonate (7:3 ratio by volume) applied at a 2% by weight level, effectively controls the dusting of dicalcium phosphate.

EXAMPLE 5

Evaluation of Molasses:Calcium Lignosulfonate Coating Mixture for Dedusting Feed-grade Dicalcium Phosphate The procedure employed in this evaluation is essentially that described in Example 3 above. One ton samples (2240 kg) of feed-grade dicalcium phosphate (phosphorus content: 18.5% by weight) is maintained at about 65° C. to 75° C. in a holding bin. The bin is fitted with a vibratory feeder upon which the particulate dicalcium phosphate is deposited. The particulate material drops from the vibratory feeder in free fall as a falling curtian of material, which is treated with a fine spray of the coating mixture of molasses:calcium lignosulfonate (7:3 ratio by volume; specific gravity at 43° C.: 1.10 to 1.20 cm$^{-3}$). Where the molasses:calcium lignosulfonate coating mixture is too viscous, water is added to achieve the desired viscosity. Adjustment of the molasses:surfactant mixture to a specific gravity between 1.10 and 1.20 cm$^{-3}$ at 43° C. has been found to provide mixtures of acceptable viscosity.

In these tests, the one ton samples are treated with 1.0%, 1.5%, 2.0% and 3.0% by weight of the molasses:surfactant mixture and deposited in a mixing screw, transported by this mechanism to an elevator and deposited on a belt for transport to a holding bin. The product exiting the belt was observed throughout the test and again after storage in the holding bins. Untreated materials are very dry and dusty. Product treated with 1.0% by weight of the molasses:lignosulfonate mixture was somewhat dry, but markedly less dusty than the untreated product. As the percent by weight of the molasses:calcium lignosulfonate to product was increased to 1.5% and 2.0%, respectively, further progressive reductions in dust were observed. Product treated with 3.0% by weight of the molasses:calcium lignosulfonate mixture was essentially dust-free; it was neither sticky nor tacky, and did not hang up or agglomerate in the storage bins.

We claim:

1. A coated, solid composition with reduced dusting properties comprising:
   (a) from about 97% to about 99% by weight based on the coated solid composition of a finely divided particulate feed-grade substrate of a calcium phosphate selected from monocalcium phosphate, dicalcium phosphate or mixtures thereof; and
   (b) from about 1% to about 3% by weight of a coating mixture comprising, molasses, water and a surfactant of glycerol monoricinoleate or calcium lignosulfonate, in a molasses to surfactant ratio of about 7:3 by volume.

2. A composition according to claim 1, wherein the calcium phosphate is about 97% to 98% by weight of the composition; the molasses and surfactant coating mixture is about 2% to 3% by weight of the composition; the molasses is cane molasses, citrus molasses, beet molasses, sorghum molasses or wood molasses; the surfactant is calcium lignosulfonate or glycerol monoricinoleate; and the molasses to surfactant ratio is 7:3 by volume.

3. A composition according to claim 2, wherein the surfactant is calcium lignosulfonate, and the mixture has a specific gravity of from 1.0 to 1.2 cm$^{-3}$ at 43° C.

4. A composition according to claim 3, wherein the calcium phosphate is monocalcium phosphate.

5. A composition according to claim 3, wherein the calcium phosphate is dicalcium phosphate.

6. A composition according to claim 3, wherein the calcium phosphate is a mixture of monocalcium phosphate and dicalcium phosphate.

7. A method for the preparation of a uniformly coated particulate solid composition comprising a core material containing from about 97% to about 99% by weight based on the solid composition of a feed-grade calcium phosphate selected from monocalcium phosphate, dicalcium phosphate or mixtures thereof, while these are maintained at the temperature range of 50° C. to 80° C. and a coating; comprising spraying onto the surface of the composition while in a falling curtain a coating mixture of molasses, water and a surfactant of calcium lignosulfonate or glycerol monoricinoleate, so as to provide from about 3% to about 1% based on the weight of the composition of said coating, and the temperature of the coating mixture is maintained in the range of 35° C. to 60° C. during application; to obtain a uniformly coated, free-flowing and dry composition with reduced dusting properties.

8. A method according to claim 7, wherein the calcium phosphate particles are heated to a temperature between 65° C. and 71° C., and the molasses:surfactant:water mixture having a specific gravity of 1.1 to 1.2 cm$^{-3}$ at 43° C., is heated to a temperature between 35° C. and 60° C. during application thereof to the calcium phosphate.

* * * * *